United States Patent
Kim et al.

(10) Patent No.: US 8,861,581 B2
(45) Date of Patent: Oct. 14, 2014

(54) RECEIVERS FOR PROCESSING VESTIGIAL SIDEBAND SIGNALS AND PROCESSING METHODS THEREOF

(75) Inventors: DoHan Kim, Suwon-si (KR); Sergey Zhidkov, Suwon-si (KR); Beom kon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 571 days.

(21) Appl. No.: 13/079,909

(22) Filed: Apr. 5, 2011

(65) Prior Publication Data

US 2011/0243213 A1   Oct. 6, 2011

(30) Foreign Application Priority Data

Apr. 5, 2010   (KR) .................. 10-2010-0031069

(51) Int. Cl.
*H03H 7/30* (2006.01)
(52) U.S. Cl.
USPC ............ 375/232; 375/270; 375/277; 375/321; 375/233; 375/265; 375/262; 375/341; 375/316; 375/346; 455/47; 455/204; 714/780; 714/784; 714/795; 714/792; 714/796; 329/357
(58) Field of Classification Search
USPC .......... 714/780, 784, 795, 792, 796; 375/321, 375/270, 277, 346, 316, 232, 233, 265, 262, 375/341; 329/357; 455/47, 204
See application file for complete search history.

(56) References Cited

U.S. PATENT DOCUMENTS

| | | | |
|---|---|---|---|
| 7,194,047 B2 * | 3/2007 | Strolle et al. ................. | 375/341 |
| 2004/0128610 A1 | 7/2004 | Wei | |
| 2010/0231803 A1 * | 9/2010 | Citta et al. .................... | 348/723 |

FOREIGN PATENT DOCUMENTS

| KR | 1020050109201 A | 11/2005 |
|---|---|---|
| KR | 1020070071459 A | 7/2007 |
| KR | 1020080105356 A | 12/2008 |

OTHER PUBLICATIONS

G. D. Forney, Jr., "Maximum-Likelihood Sequence Estimation of Digital Sequences in the Presence of Intersymbol Interference," IEEE Trans. Inform. Theory, vol. IT-18, pp. 363-378, May 1972.
G. Ungerboeck, "Channel Coding with Multilevel/Phase Signals," IEEE Trans. Inform. Theory, vol. IT-28, Jan. 1982, pp. 56-57.
P. R. Chevillat, E. Eleftheriou, "Decoding of Trellis-Encoded Signals in the Presence of Intersymbol Interference and Noise," IEEE Trans. Commun. vol. 37, No. 7, Jul. 1989, pp. 669-676.
Wesolowski, K., "Performance of the Receivers of Trellis-Coded Data Signals Transmitted Through HF Channels," Fourth International Conference on HF Radio Systems and Techniques, Apr. 11-14, 1988, pp. 305-309.
T. Kasami and S. Lin, "On the Probability of Undetected Error for the Maximum Distance Separable Codes," IEEE Trans. Commun., vol. COM-32, pp. 998-1006, Sep. 1984.

* cited by examiner

*Primary Examiner* — Rahel Guarino
(74) *Attorney, Agent, or Firm* — Myers Bigel Sibley & Sajovec, P.A.

(57) ABSTRACT

Provided is a receiver for processing VSB signal. The receiver includes a first equalizer/decoder unit and a second equalizer/decoder unit. The first equalizer/decoder unit performs a first equalizing operation, first TCM decoding and first RS decoding on a received symbol to output a first dibit. The second equalizer/decoder unit performs a second equalizing operation, second TCM decoding and second RS decoding on the received symbol to output a transport stream. The first dibit is provided as a priori information for a soft-decision operation of the second TCM decoding.

12 Claims, 7 Drawing Sheets

RECEIVERS FOR PROCESSING VESTIGIAL SIDEBAND SIGNALS AND PROCESSING METHODS THEREOF

CROSS-REFERENCE TO RELATED APPLICATIONS

This U.S. non-provisional patent application claims priority under 35 U.S.C. §119 of Korean Patent Application No. 10-2010-0031069, filed on Apr. 5, 2010, the entire contents of which are hereby incorporated by reference as if set forth fully herein.

BACKGROUND

The present disclosure relates to a digital broadcasting system, and more particularly, to a receiver for processing vestigial sideband (VSB) signal and a processing method thereof.

Recently, broadcasting systems have been rapidly changing from analog schemes to one or more digital schemes. It is expected that digital broadcasting systems may completely replace the existing analog broadcasting systems after a few years.

Limitations in the theory and actual functionality of digital broadcasting systems and/or digital communication systems include Inter-Symbol Interference (ISI) in channels. Various channel equalization techniques have been developed for removing ISI. Such channel equalization techniques include, for example, Maximum-Likelihood Sequence Estimation (MLSE), Linear Equalization (LE) and Decision-Feedback Equalization (DFE).

In digital broadcasting systems, various channel coding and error correction techniques are used for correcting errors that occur due to noise. Particularly, in a digital television (TV) broadcasting system using an ATSC 8-VSB scheme, Reed-Solomon Code (RSC) linked with Trellis-Coded Modulation (TCM) may be used.

As an optimal scheme of decoding TCM data that is transmitted through an ISI channel where ISI exists, there is joint MLSE called Super Trellis. However, because of complexity that exponentially increases with respect to the time variable characteristics of channels, joint MLSE is recognized as not being suitable.

As the second scheme for solving such a limitation, there is a scheme that compensates ISI through a Decision Feedback Equalizer (DFE) and decodes TCM data with a Viterbi decoder. Such scheme is often used in actual works, but may have severe limitations. For TCM data received, the decision feedback equalizer that operates prior to a TCM decoder, should use an uncoded symbol for performing a feedback operation. The reliability of an uncoded symbol inputted to the decision feedback equalizer is relatively very low. Consequently, performance enhancements of the decision feedback equalizer may be limited.

In techniques of decoding TCM data, as an alternative technique that may have a small hardware burden and provide performance equivalent to that of optimal MLSE, the decision feedback equalizer and the TCM decoder (or Viterbi decoder) may be connected in cascade. However, the decision feedback equalizer references data provided from the TCM decoder instead of referencing the decision value of a decision unit (for example, a slicer). That is, the decision feedback equalizer uses a symbol decision value using the optimal survivor path of the TCM decoder. Such a scheme provides better performance than that of a scheme where the decision feedback equalizer and the TCM decoder are separately driven. This is because the decision value of the TCM decoder using the optimal survivor path has much higher reliability than that of a decision value by the slicer.

However, the developments of low-cost ATSC receivers having high performance are still urgently required for the generalization and popularization of digital broadcasting.

SUMMARY

The present disclosure provides a digital television (TV) receiver, which can enhance reliability of received data at a multipath and time variable channel environment.

Embodiments of the inventive concept provide a receiver for processing vestigial sideband (VSB) signal including: a first equalizer/decoder unit performing a first equalizing operation, first Trellis-Coded Modulation (TCM) decoding and first Reed-Solomon (RS) decoding on a received symbol to output a first dibit; and a second equalizer/decoder unit performing a second equalizing operation, second TCM decoding and second RS decoding on the received symbol to output a transport stream, wherein the first dibit is provided as a priori information for a soft-decision operation of the second TCM decoding.

In other embodiments of the inventive concept, a method for processing vestigial sideband (VSB) reception signal in a receiver, including a decision feedback equalizer, includes: generating a decision value of a received symbol; performing Reed-Solomon (RS) decoding on the decision value to correct an error; converting the error-corrected decision value into a dibit; and performing Trellis-Coded Modulation (TCM) decoding of the decision feedback equalizer on the basis of the dibit.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Figure 1:
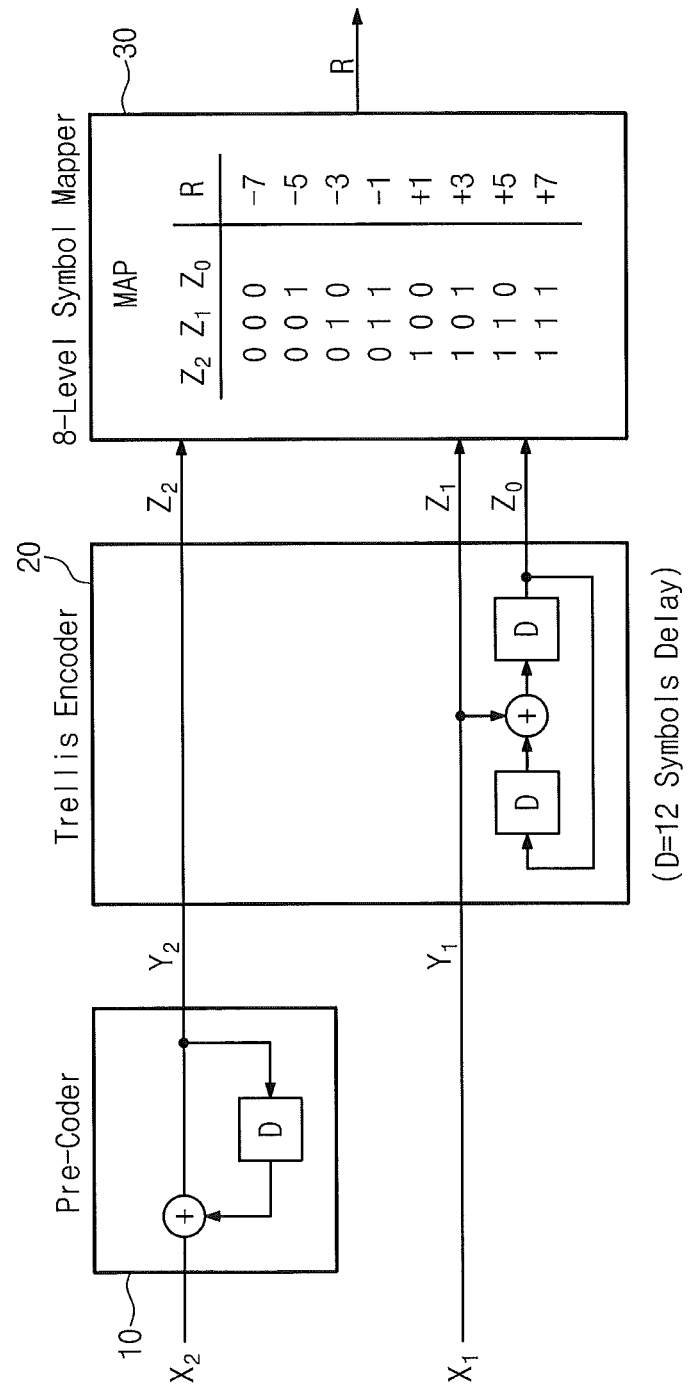
FIG. 1 is a block diagram illustrating a structure of a Trellis-Coded Modulation (TCM) encoder of a digital broadcasting system according to some embodiments of the inventive concept.

The present disclosure now will be described more fully hereinafter with reference to the accompanying drawings, in which embodiments are shown. However, this disclosure should not be construed as limited to the embodiments set forth herein. Rather, these embodiments are provided so that this disclosure will be thorough and complete, and will fully convey the scope of the disclosure to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. The present disclosure will now be described more fully hereinafter with reference to the accompanying drawings, in which preferred embodiments may be shown. This disclosure, however, may be embodied in many different forms and should not be construed as limited to the embodiments set forth herein. Rather, these embodiments are provided so that this disclosure will be thorough and complete, and will fully convey the scope of the invention to those skilled in the art.

It should be construed that forgoing general illustrations and following detailed descriptions are exemplified and an additional explanation is provided.

Reference numerals are indicated in detail in some embodiments of the present disclosure, and their examples are represented in reference drawings. Throughout the drawings, like reference numerals are used for referring to the same or similar elements in the description and drawings.

Various embodiments of the present disclosure are described below with reference to block diagrams illustrating methods, apparatus and computer program products according to various embodiments of the disclosure. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

Other software, such as an operating system, also may be included. It will be further appreciated that the functionality of the risk prediction module 100 and/or other modules described herein may be embodied, at least in part, using discrete hardware components, one or more Application Specific Integrated Circuits (ASIC) and/or one or more special purpose digital processors and/or computers.

Below, a digital television (TV) broadcasting system using an ATSC 8-VSB scheme is used as one example for illustrating characteristics and functions of the present invention. However, those skilled in the art can easily understand other advantages and performances of the present invention according to the descriptions herein. The present invention may be embodied or applied through other embodiments. Besides, the detailed description may be amended or modified according to viewpoints and applications, not being out of the scope, technical idea and other objects of the present invention. Hereinafter, some embodiments of the inventive concept will be described in detail with reference to the accompanying drawings.

FIG. 1 is a block diagram illustrating a structure of a Trellis-Coded Modulation (TCM) encoder of a digital broadcasting system according to some embodiments of the present invention.

Referring to FIG. 1, a TCM encoder used in an ATSC 8-VSB transmission system includes a pre-coder 10, a trellis encoder 20, and a symbol mapper 30. Herein, transmission data $\{X_2, X_1\}$ is 2-bit unit data where a randomizing operation, a Reed-Solomon (RS) encoding operation and an interleaving operation have been completed on a transmission signal.

The pre-coder 10 encodes a bit $X_2$ corresponding to Most Significant Bit (MSB) in the transmission data $\{X_2, X_1\}$. An XOR logic operation is performed on the bit $X_2$ (MSB) and a previous bit that is 12-symbol-delayed by the pre-coder 10, and thus a bit $Y_2$ is outputted. Through such a scheme, the pre-coder 10 performs a pre-coding operation on the bit $X_2$ (MSB) to add correlation with respect to a previously-encoded bit. The bit $Y_2$ processed by the pre-coder 10 is transferred as a bit $Z_2$ to the symbol mapper 30 without additionally processing of the trellis encoder 20.

The trellis encoder 20 is a 4-state encoder that encodes one input bit into two bits. The trellis encoder 20 processes a bit $X_1$ ($=Y_1$) corresponding to Least Significant Bit (LSB) among the transmission data $\{X_2, X_1\}$ in a trellis encoding scheme based on an illustrated algorithm to output two bits $\{Z_1, Z_0\}$. Therefore, one input bit $X_1$ ($=Y_1$) is encoded into 2-bit data $\{Z_1, Z_0\}$ by using a Viterbi code having a code rate of 1/2. A bit $Z_1$ is outputted as the same bit value as the bit $X_1$ ($=Y_1$) that is not encoded. However, a bit $Z_0$ is generated as a bit having correlation with a bit before 12 symbols and 24 symbols by Viterbi encoding on the bit $X_1$ ($=Y_1$). 2-bit transmission data $\{X_2, X_1\}$ is transferred as a 3-bit combination $\{Z_2, Z_1, Z_0\}$ to the symbol mapper 30 by the trellis encoder 20.

The symbol mapper 30 maps the 3-bit combination $\{Z_2, Z_1, Z_0\}$ to an 8-level VSB symbol (R). For example, a symbol level corresponding to $\{110\}$ is mapped to +5, and a symbol level corresponding to $\{011\}$ is mapped to −1.

In the above-described TCM encoder, an error correction ability that is provided by the trellis encoder 20 in a single carrier scheme may not be particularly strong. Therefore, high output energy may be used to improve reception performance at a poor environment. However, in a receiver having a multi-stage equalizer-decoder structure according to some embodiments of the inventive concept, the operated result of an RS decoder may be used in a TCM decoder. That is, a priori information on the transmission data $\{X_2, X_1\}$ that is generated in the RS decoder may be used for the soft-decision operation of the TCM decoder.

Figure 2:
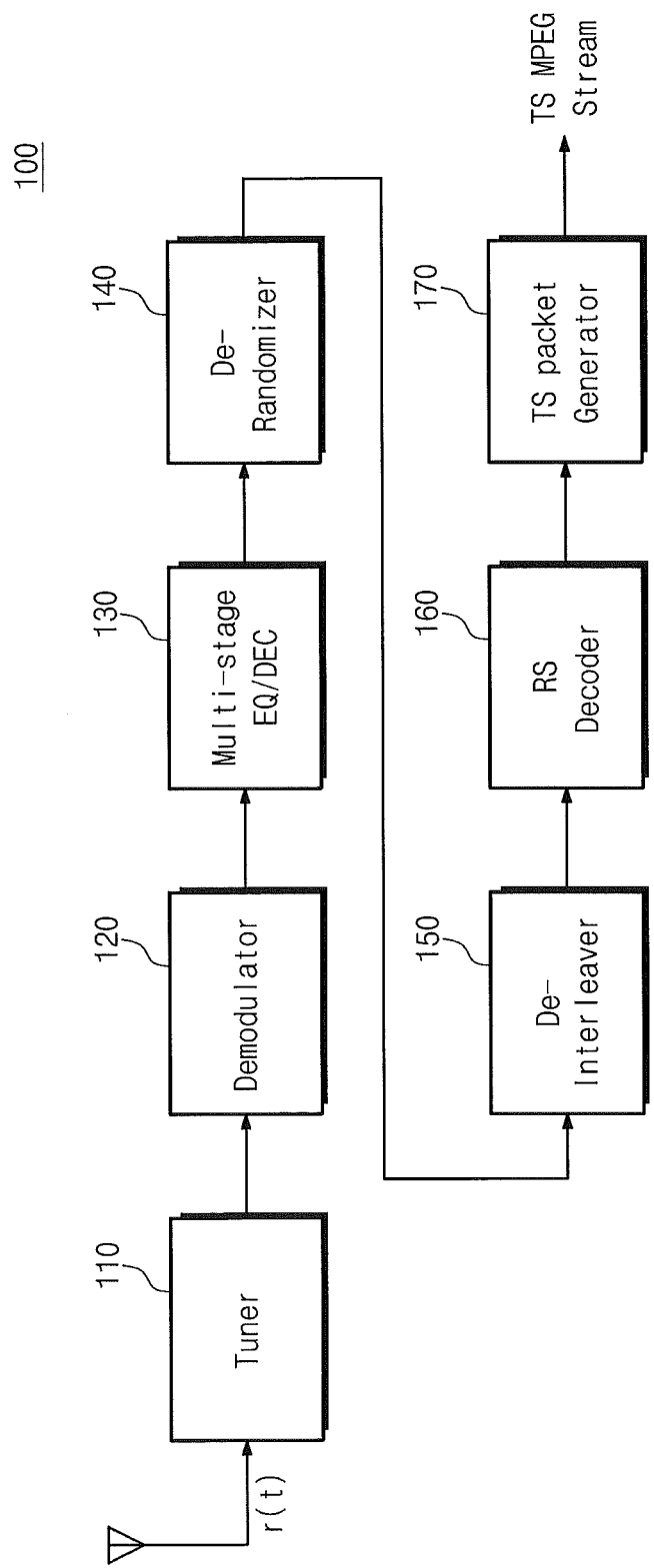
FIG. 2 is a block diagram illustrating a digital TV receiver according to some embodiments of the inventive concept.

FIG. 2 is a block diagram illustrating a digital TV receiver according to some embodiments of the inventive concept.

Referring to FIG. 2, a digital TV receiver 100 includes a tuner 110, a demodulator 120, a multi-stage equalizer/decoder 130, a de-randomizer 140, a de-interleaver 150, an RS decoder 160, and a TS packet generator 170.

The tuner 110 down-converts a Radio Frequency (RF) signal, which may be received as a carrier frequency through an antenna, into a baseband signal. When the RF signal is mixed with an oscillation frequency generated by a local oscillator (not shown), the RF signal of a carrier band may be down-converted into an Intermediate Frequency (IF) band. Herein, the received RF signal may be a VSB signal that is modulated in a single carrier modulation scheme or a multi-carrier modulation scheme. The tuner 110 may convert the received signal of a selected band into a fixed IF signal and provide the converted signal to the demodulator 120.

The demodulator 120 converts the VSB signal, which is down-converted into the IF band by the tuner 110, into a bit stream. For example, the demodulator 120 may include an analog-to-digital (A/D) converter (not shown) that converts the VSB signal into a digital signal. The demodulator 120 may output the VSB signal as a symbol sequence (or a bit stream).

The multi-stage equalizer/decoder 130 performs an adaptive channel equalization, TCM decoding and RS decoding on the symbol sequence outputted from the demodulator 120. A decision feedback equalizer is used for the adaptive channel equalization, a TCM decoder is used for the TCM decoding, and an RS decoder is used for the RS decoding. Generally, the compensation effect of Inter-Symbol Interference (ISI) in the decision feedback equalizer is largely affected by reliability of the decision value of the TCM decoder. Moreover, reliability of the TCM decoder may increase according to the presence of a priori information used for a soft-decision operation or the amount of the information.

In the multi-stage equalizer/decoder 130 according to some embodiments of the inventive concept, a priori information of the transmission data $\{X_2, X_1\}$ generated through the RS decoder may be provided to the TCM decoder. Therefore, the TCM decoder may determine data at high reliability. Moreover, the TCM decoder feeds back a state metric (for example, an optimal survivor path metric or a branch metric) or a decision value to the decision feedback equalizer. The decision feedback equalizer may receive an equalizer initial value having high accuracy. Accordingly, the multi-stage equalizer/decoder 130 can output data having high reliability at a time variable and multipath channel environment.

To provide a more detailed description on the structure and/or operations of the multi-stage equalizer/decoder 130, at least 2-stage equalizing and decoding (TCM and RS) operations are performed. In a first equalizing and decoding stage, the multi-stage equalizer/decoder 130 sequentially performs an adaptive channel equalizing operation, TCM decoding and RS decoding on a received symbol. The multi-stage equalizer/decoder 130 interleaves and dibitizes RS-decoded data and converts the data into a sequence corresponding to the transmission data $\{X_2, X_1\}$.

In a second equalizing and decoding stage, the multi-stage equalizer/decoder 130 performs an adaptive channel equalizing operation, TCM decoding and RS decoding on a symbol sequence through the same operation as that of the first equalizing and decoding stage. Particularly, after the second equalizing and decoding stage, a dibit generated through the decoding operation of a previous stage is used as a priori information for performing a TCM decoding operation. If the second equalizing and decoding stage is the last stage, the multi-stage equalizer/decoder 130 outputs a Transport Stream (TS) that is generated after second channel equalizing, de-interleaving and RS decoding on a symbol sequence.

The de-randomizer 140 performs a de-randomizing operation on a transport stream provided from the multi-stage equalizer/decoder 130. The de-randomizer 140 performs a de-randomizing operation to a randomizing operation performed in a transmitter, and thereby recovers a sequence into a symbol sequence upon transmission.

The de-interleaver 150 receives an output of the de-randomizer 140 and sequences the output in the reverse order of the interleaving scheme of the transmitter. When errors are scattered, a convolution code applied to a Viterbi algorithm may have a relatively higher error correction ability. However, when errors intensively occur in a specific symbol or data according to channel characteristic, it may not be easy to recover data. For example, if a burst error occurs, it may be difficult to correct the burst error because the errors are concentrated in a specific data field.

Therefore, the transmitter (not shown) allows burst errors, which may occur in a channel through interleaving, to be scattered in a symbol or data sequence. In the receiver, the TCM decoder (not shown) of the multi-stage equalizer/decoder 130 recovers an interleaved symbol sequence. The de-interleaver 150 re-sequences data interleaved by the transmitter in reverse order. Even when the data re-sequenced by the de-interleaver 150 includes a burst error, it has a scattered error pattern.

The RS decoder 160 corrects the error of data that is interleaved in an RS code scheme. Even an uncorrectable packet error may be detected by a long RS decoder. An ATSC VSB transmission system uses an RS (207, 187, t=10) decoder. That is, the size of a data block is 187 bytes, and twenty RS additional bytes are added for error correction. An entire RS block having a 207-byte size is transmitted per data segment.

The TS packet generator 170 generates a TS MPEG stream with a decoded symbol sequence.

As described above, the multi-stage equalizer/decoder 130 may repeat RS decoding and apply a priori information, which is generated through the RS decoding, to TCM decoding. Through repetition of RS decoding, the correction probability of an uncorrectable error can increase. Reliability of TCM decoding can increase by providing of a priori information. Furthermore, as accuracy of TCM decoding increases, compensation performance for ISI of an equalizer which receives a TCM decoded result through feedback can considerably increase.

Figure 3A:
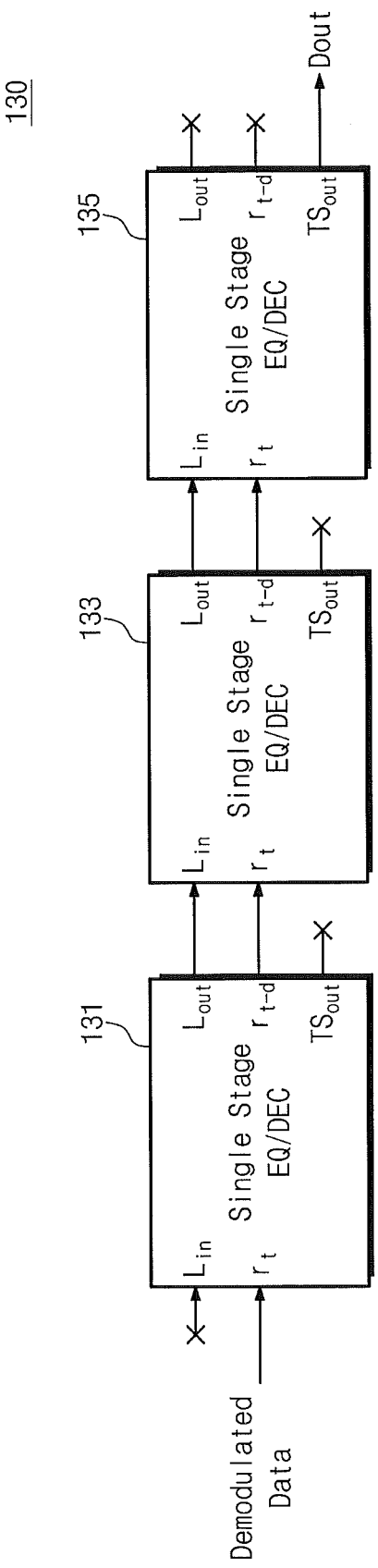
FIG. 3A is a block diagram illustrating an example of a multi-stage equalizer/decoder in FIG. 2.

FIG. 3A is a block diagram illustrating an example of the multi-stage equalizer/decoder in FIG. 2.

Referring to FIG. 3A, the configuration of the multi-stage equalizer/decoder 130 having a 3-stage structure is exemplarily illustrated.

The multi-stage equalizer/decoder 130 includes a first equalizer/decoder 131, a second equalizer/decoder 133, and a third equalizer/decoder 135. The configurations or operation characteristics of the second and third equalizer/decoders 133 and 135 may be set identically. Alternatively, the configurations of the first to third equalizer/decoders 131, 133 and 135 are the same, but the operations of the first to third equalizer/decoders 131, 133 and 135 may be set in order for only a specialized function to be activated according to purposes.

First, demodulated data or a symbol sequence that is provided from the demodulator 120 (see FIG. 2) is inputted to the data input terminal $r_t$ of the first equalizer/decoder 131. The first equalizer/decoder 131 performs an adaptive channel equalizing operation on the input symbol sequence. Furthermore, the first equalizer/decoder 131 performs a decoding operation on data that is generated through a channel equalizing operation, according to a TCM decoding operation. The decoded data is re-sequenced in a time domain through a de-interleaving operation.

Subsequently, the first equalizer/decoder 131 performs first RS decoding to generate a first transport stream. The first transport stream is re-sequenced through an interleaving operation that is again performed, thereby being converted into a dibit. The first equalizer/decoder 131 transfers the dibit to an output terminal Lout. The first equalizer/decoder 131 transfers a delayed symbol sequence to an output terminal $r_{t-d}$ without separate processing. However, the first transport stream may be transferred to a transport stream output terminal TSout, but is not inputted to the second equalizer/decoder 133.

A symbol sequence provided from the first equalizer/decoder 131 is provided to the second equalizer/decoder 133 through a data input terminal $r_t$. The second equalizer/decoder 133 processes the input symbol sequence according to the same operation as that of the first equalizer/decoder 131. However, the second equalizer/decoder 133 uses a dibit, which is provided from the first equalizer/decoder 131 through an input terminal Lin, as a priori information for TCM decoding.

The TCM-decoded data is re-sequenced in a time domain through a de-interleaving operation. The second equalizer/decoder 133 performs second RS decoding on de-interleaved data to generate a second transport stream. The second transport stream is re-sequenced through an interleaving operation that is again performed, thereby being converted into a dibit. The second equalizer/decoder 133 transfers the dibit to an output terminal Lout. The second equalizer/decoder 133 transfers a delayed symbol sequence to an output terminal $r_{t-d}$ without separate processing. However, the second transport stream may be transferred to a transport stream output terminal TSout, but is not inputted to the third equalizer/decoder 135.

The third equalizer/decoder 135 processes a symbol sequence inputted from the second equalizer/decoder 133 on the basis of the dibit provided from the second equalizer/decoder 133. The third equalizer/decoder 135 processes the symbol sequence according to the same operation as that of the second equalizer/decoder 133. That is, the third equalizer/decoder 135 performs an adaptive channel equalizing operation on the input symbol sequence. Furthermore, the third equalizer/decoder 135 performs TCM decoding on data that is generated through the adaptive channel equalizing operation. The TCM-decoded data is re-sequenced in a time domain through a de-interleaving operation. Subsequently, the third equalizer/decoder 135 performs third RS decoding on the data re-sequenced in the time domain to generate a third transport stream. The third equalizer/decoder 135 transfers the third transport stream to an output terminal TSout. Then, the third transport stream is outputted as an output signal.

The above-described multi-stage equalizer/decoder 130 uses a dibit, which is generated through RS decoding for increasing accuracy of TCM decoding, as a priori information. Therefore, in the multi-stage equalizer/decoder 130, accuracy of TCM decoding can considerably increase. Also, the filtering performance of an equalizer to which the result of TCM decoding is fed back can be serially enhanced.

Herein, the multi-stage equalizer/decoder 130 configured in three stages has been exemplified above for describing the technical feature of the inventive concept. However, some embodiments of the inventive concept are not limited thereto. That is, the second equalizer/decoder 133 may be omitted in the multi-stage equalizer/decoder 130, and the multi-stage equalizer/decoder 130 may be configured as a 2-stage equalizer/decoder where the first and third equalizer/decoders 131 and 135 are connected in cascade. Alternatively, the multi-stage equalizer/decoder 130 may include at least two or more equalizer/decoder units between the first and third equalizer/decoders 131 and 135.

Figure 3B:
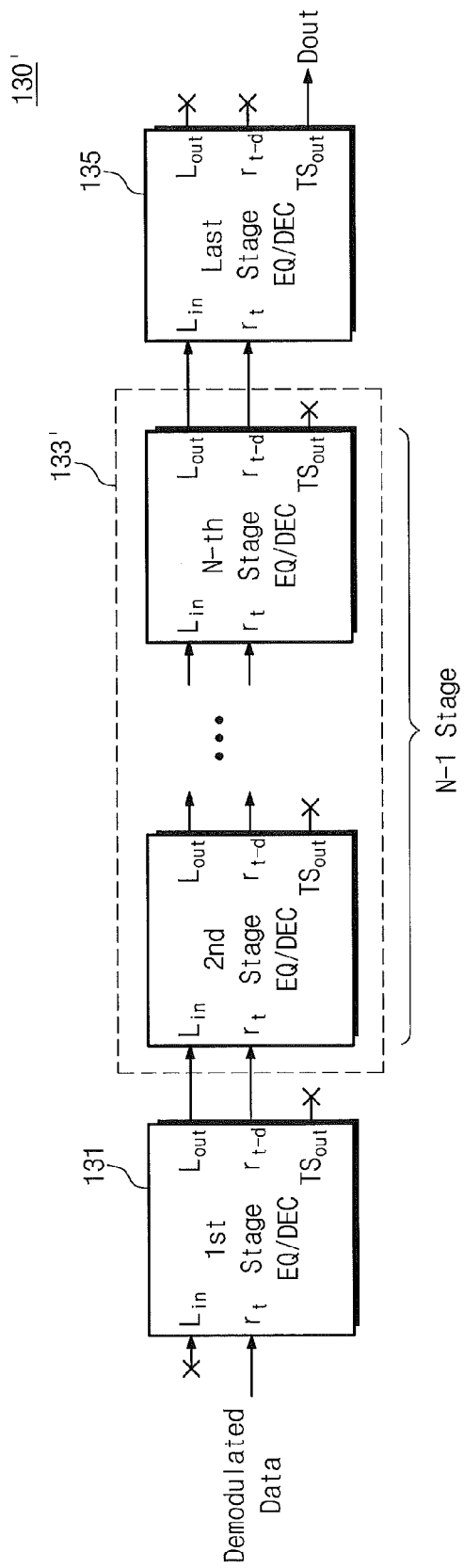
FIG. 3B is a block diagram illustrating another example of the multi-stage equalizer/decoder in FIG. 2.

FIG. 3B is a block diagram illustrating another example of the multi-stage equalizer/decoder in FIG. 2.

Referring to FIG. 3B, the structure of a multi-stage equalizer/decoder 130' configured in N+1 stages is exemplarily illustrated.

The multi-stage equalizer/decoder 130' includes N−1st-stage equalizer/decoders 133' between a first-stage equalizer/decoder 131 and a last-stage equalizer/decoder 135. Like the multi-stage equalizer/decoder 130 of FIG. 3A, a symbol sequence provided from the demodulator 120 (see FIG. 2) is inputted to the data input terminal $r_t$ of the first-stage equalizer/decoder 131. The first-stage equalizer/decoder 131 performs an adaptive channel equalizing operation on the input symbol sequence. Furthermore, the first-stage equalizer/decoder 131 performs TCM decoding on data that is generated through a channel equalizing operation. The TCM-decoded data is re-sequenced in a time domain through de-interleaving.

Subsequently, the first-stage equalizer/decoder 131 performs first RS decoding to generate a first transport stream. The first transport stream is re-sequenced through interleaving that is again performed, and is converted into a dibit. The first-stage equalizer/decoder 131 transfers the dibit to an output terminal Lout. The first-stage equalizer/decoder 131 transfers a delayed symbol sequence to an output terminal $r_{t-d}$ without separate processing. However, the first transport stream may be transferred to a transport stream output terminal TSout, but may not be inputted to a second-stage equalizer/decoder.

The N−1st-stage equalizer/decoders 133' repeat the above-described processing operation of the second equalizer/decoder 133 N−1 times. The dibit generated by the N−1st-stage equalizer/decoders 133' and the symbol sequence that is delayed without separate processing are transferred to the last-stage equalizer/decoder 135.

The last-stage equalizer/decoder 135 processes the symbol sequence inputted from the N−1st-stage equalizer/decoders 133' on the basis of the dibit. The last-stage equalizer/decoder 135 performs an adaptive channel equalizing operation on the input symbol sequence. The last-stage equalizer/decoder 135 performs TCM decoding on data that is generated through a channel equalizing operation. The TCM-decoded data is re-sequenced in a time domain through de-interleaving. Subsequently, the last-stage equalizer/decoder 135 performs last RS decoding on the data re-sequenced in the time domain to generate a last transport stream. The last-stage equalizer/decoder 135 transfers the last transport stream to an output terminal TSout. Then, the last transport stream is provided as an output signal Dout.

The above-described multi-stage equalizer/decoder 130' uses a dibit, which is generated through RS decoding for increasing accuracy of TCM decoding, as a priori information. Therefore, in the multi-stage equalizer/decoder 130', accuracy of TCM decoding can considerably increase. Equalizer/decoder units may be serially connected in a multi-stage structure, and thus a priori information generated through RS decoding may be applied to TCM decoding.

Figure 4:
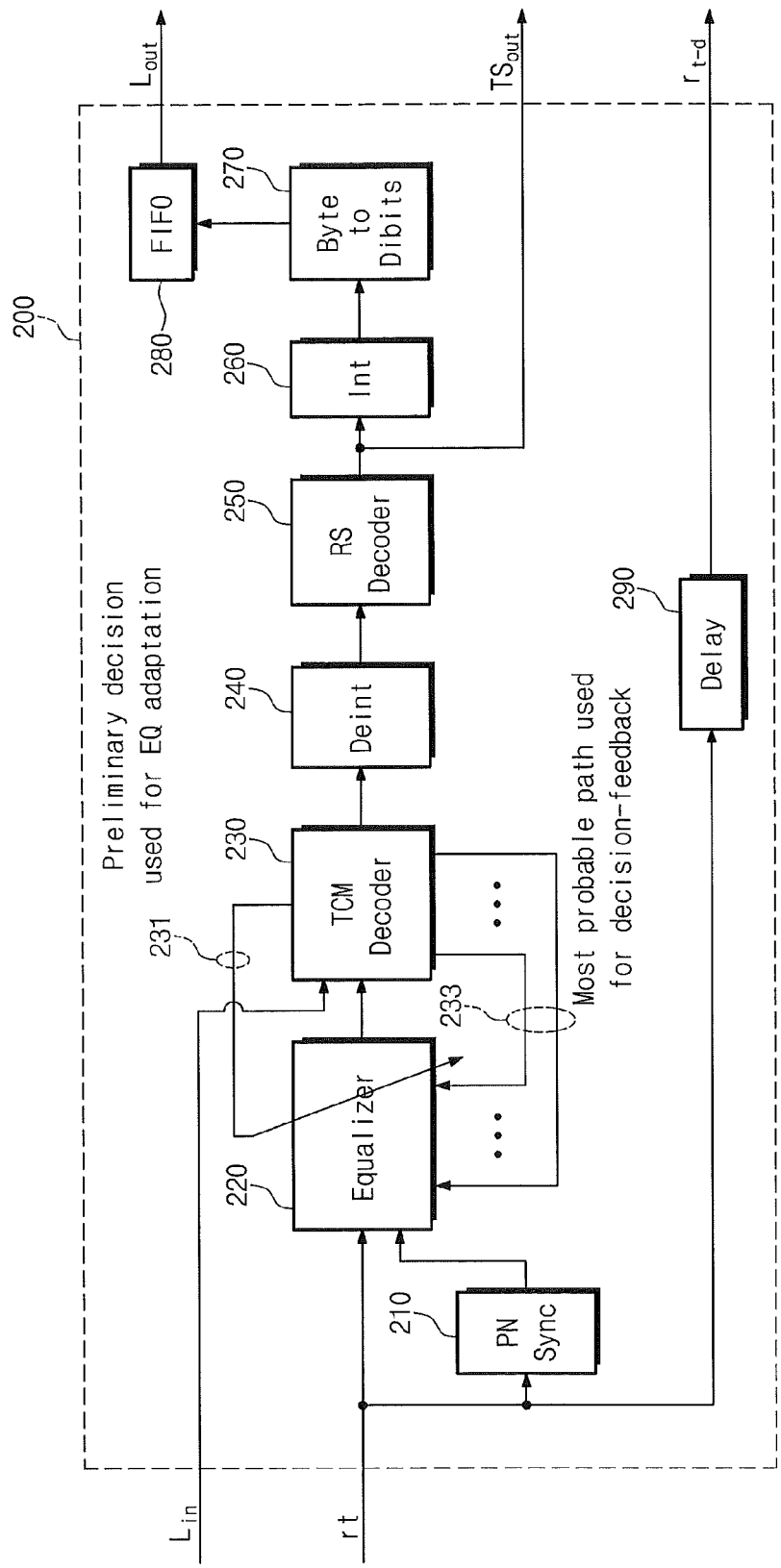
FIG. 4 is a block diagram exemplarily illustrating a configuration of an equalizer/decoder unit which configures the multi-stage equalizer/decoder of FIG. 3A or the multi-stage equalizer/decoder of FIG. 3B.

FIG. 4 is a block diagram exemplarily illustrating a configuration of an equalizer/decoder unit which configures the multi-stage equalizer/decoder 130 of FIG. 3A or the multi-stage equalizer/decoder 130' of FIG. 3B. The first to third equalizers/decoders 131, 133 and 135 of FIG. 3A may be configured identically to an equalizer/decoder unit 200, respectively. Also, the first-stage to last-stage equalizers/decoders 131, 133' and 135 of FIG. 3B may be configured identically to the equalizer/decoder unit 200, respectively.

Referring to FIG. 4, the equalizer/decoder unit 200 includes a PN synchronizer 210, an equalizer 220, a TCM decoder 230, a de-interleaver 240, an RS decoder 250, an interleaver 260, a dibit converter 270, a First-In, First-Out (FIFO) 280, and a delay 290.

When a symbol sequence $r_t$ is inputted to the equalizer/decoder 200, the symbol sequence $r_t$ is transferred through three paths. First, a PN sequence transmitted by the PN synchronizer 210 is synchronized. The symbol sequence $r_t$ is inputted to the equalizer 220 and filtered. The symbol sequence $r_t$ inputted to the delay 290 is synchronized with a transport stream and a dibit that are outputted from the equalizer/decoder unit 200.

The equalizer 220 may be configured as a decision feedback equalizer that applies survivor path information, which is fed back from the TCM decoder 230, to update of an equalizer coefficient. Particularly, a final decision value that is decided by tracing a survivor path from the TCM decoder 230 may be used for updating the equalizer coefficient. However, when using all path metrics 233 to update the equalizer coefficient, a more enhanced performance of an equalizer can be secured. The equalizer 220 may use data 231, which is decided from the TCM decoder 230, to update the equalizer coefficient.

The equalizer 220 may be configured with a feedforward part and a feedback part. Alternatively, the equalizer 220 may be configured as a recursive equalizer that divides a symbol sequence into a plurality of sections and recursively performs a high-speed equalizer coefficient adaptation operation on each of the divided sections.

The TCM decoder 230 decodes an output signal (i.e., an equalized output) from the equalizer 130 according to a trellis code decoding algorithm having an error correction ability. The TCM decoder 230 may perform decoding on an input symbol to a corresponding decoding depth. When a decoding depth is large, decision can be made as an accurate data value because a trace-back size increases.

The TCM decoder 230 receives a priori information that may increase reliability of a soft-decision operation. That is, except for an equalizer/decoder unit that performs an initial operation on a symbol sequence transferred, an equalizer/decoder unit corresponding to 2 or more stages receives a dibit generated in a previous stage through an input terminal Lin. The TCM decoder 230 may increase a branch metric with the received dibit.

The de-interleaver 240 receives the output of the TCM decoder 230 and sequences the received output in the reverse order of the interleaving scheme of the transmitter. A convolution code applied to a Viterbi algorithm has a relatively higher error correction ability when errors are scattered. However, when errors intensively occur in a specific symbol or data according to channel characteristic, it may not be easy to recover data. For example, if a burst error occurs, it is difficult to correct the burst error because errors are concentrated in a specific data field.

Therefore, the transmitter (not shown) allows burst errors, which occur in a channel through interleaving, to be scattered in a symbol or data sequence. In the receiver, the TCM decoder 230 recovers an interleaved symbol sequence. The de-interleaver 240 re-sequences data which is interleaved by the transmitter on the output of the TCM decoder 230, in reverse order. Even when the data re-sequenced by the de-interleaver 240 includes a burst error, it has a scattered error pattern.

The RS decoder 250 corrects the error of data that is interleaved in an RS code scheme. Even an uncorrectable packet error may be detected by a long RS decoder. An ATSC VSB transmission system uses an RS (207, 187, t=10) decoder. That is, the size of a data block is 187 bytes, and twenty RS additional bytes are added for error correction. An entire RS block having a 207-byte size is transmitted per data segment.

When using a multi-stage equalizer/decoder scheme, an RS decoder may recursively perform error correction on a transport stream. Although an error may not be corrected in an initial stage, there is much possibility that an error may be corrected in RS decoding that is performed after the initial stage.

The interleaver 260, the dibit converter 270 and the FIFO 280 are additional elements for providing a transport stream, which is error-corrected by the RS decoder 250, as a priori information to a continuous multi-stage equalizer/decoder. The interleaver 260 processes the output of the RS decoder 250 according to the same operation such as a scheme that is performed in the transmitter. The dibit converter 270 converts the data of a byte unit into the dibit of a 2-bit unit. The FIFO 280 stores and outputs dibits in a FIFO scheme.

In the above description, the exemplary configuration of the equalizer/decoder unit 200 configuring one stage has been described. All equalizer/decoder units included in the multi-stage equalizer/decoder 130 may be configured identically to the above-described equalizer/decoder unit 200. However, a specific output may be used or discarded according to a position that is inserted into the multi-stage equalizer/decoder 130.

Figure 5A:
FIGS. 5A and 5B are timing diagrams showing an effect of some embodiments of the inventive concept.
Figure 5B:
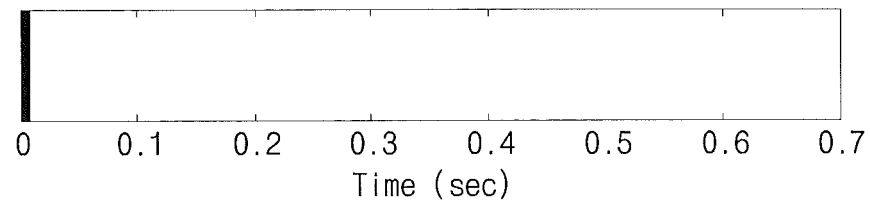

FIGS. 5A and 5B are timing diagrams showing an effect of some embodiments of the inventive concept. That is, the effects of the multi-stage equalizer/decoder are compared in FIGS. 5A and 5B, in a main channel, a ghost delay (1 μs) and a 2-channel condition having 1 dB attenuation characteristic compared to the main channel. FIG. 5A shows transmission errors in a typical receiver that does not use a multi-stage equalizer/decoder. FIG. 5B shows that the error of a transport stream which is not corrected by the decision feedback equalizer can be efficiently removed.

Figure 6:
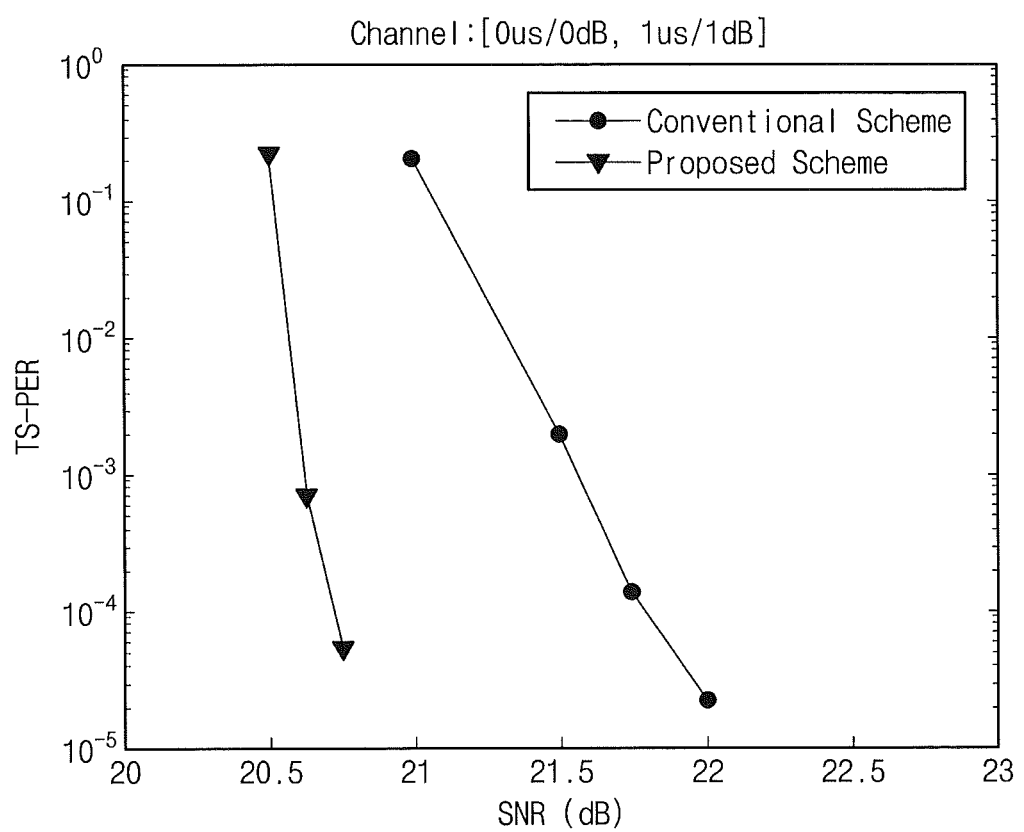
FIG. 6 is a graph schematically showing an effect of some embodiments of the inventive concept.

FIG. 6 is a graph schematically showing an effect of an embodiment of the inventive concept. In FIG. 6, performance of the receiver according to an embodiment of the inventive concept applying the multi-stage equalizer/decoder and performance of the typical receiver are shown in the main channel, the ghost delay (1 μs) and a 2-channel condition having 1 dB attenuation characteristic compared to the main channel. It is shown that the signal to noise ratio (SNR) of the receiver according to some embodiments of the inventive concept has improved by about 1 dB compared to the typical receiver, in a picture fail point (TS–PER=0.0001).

In the digital TV receiver and data processing method thereof according to some embodiments of the inventive concept, digital broadcasting data having high reliability can be received even in the multipath and time variable channel.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A receiver for processing a vestigial sideband (VSB) signal, the receiver comprising:
a first equalizer/decoder unit that is configured to perform a first equalizing operation, a first Trellis-Coded Modulation (TCM) decoding and a first Reed-Solomon (RS) decoding on a received symbol to output a first dibit;
a second equalizer/decoder unit that is configured to perform a second equalizing operation, a second TCM decoding and a second RS decoding on the received symbol to output a transport stream; and
a third equalizer/decoder unit disposed between the first and second equalizer/decoder units,
wherein the third equalizer/decoder unit is configured to sequentially perform a third equalizing operation on the received symbol, a third TCM decoding which uses the first dibit as a priori information and third RS decoding to generate a third dibit, and
wherein the third dibit is srovided to the second equalizer/ decoder unit,
wherein the first dibit is provided as a priori information for a soft-decision operation of the second TCM decoding.

2. The receiver of claim 1, wherein a path metric or a decision value generated through the second TCM decoding is provided as feedback information for the second equalizing operation.

3. The receiver of claim 2, wherein an equalizer coefficient adaptation operation is performed responsive to the feedback information in the second equalizing operation.

4. The receiver of claim 1, further comprising a plurality of equalizer/decoder units disposed between the first and second equalizer/decoder units,
wherein the plurality of equalizer/decoder units are each configured to sequentially perform an equalizing operation, a TCM decoding and an RS decoding on the received symbol, respectively.

5. The receiver of claim 4, wherein each of the plurality of equalizer/decoder units provides a dibit generated through the RS decoding and the received symbol delayed to a next equalizer/decoder unit.

6. A receiver for processing a vestigial sideband (VSB) signal, the receiver comprising:
a first equalizer/decoder unit that is configured to perform a first equalizing operation, a first Trellis-Coded Modulation (TCM) decoding and a first Reed-Solomon (RS) decoding on a received symbol to output a first dibit; and
a second equalizer/decoder unit that is configured to perform a second equalizing operation, a second TCM decoding and a second RS decoding on the received symbol to output a transport stream,
wherein the first dibit is provided as a priori information for a soft-decision operation of the second TCM decoding, and
wherein the first equalizer/decoder unit comprises:
a first equalizer that is configured to perform the first equalizing operation;
a first TCM decoder that is configured to perform the first TCM decoding on an output of the first equalizer according to a Viterbi algorithm;
a first de-interleaver that is configured to de-interleave an output of the first TCM decoder;
a first RS decoder that is configured to perform the first RS decoding on an output of the first de-interleaver;
a first interleaver that is configured to interleave an output of the first RS decoder; and a first dibit converter that is configured to convert a byte output of the first interleaver into the first dibit.

7. The receiver of claim 6, wherein the first equalizer comprises a decision feedback equalizer that is configured to apply survivor path information from the first TCM decoder to update of an equalizer coefficient.

8. The receiver of claim 7, wherein the first TCM decoder provides a path metric or a decision value based on the first TCM decoding to the first equalizer.

9. The receiver of claim 6, wherein the first equalizer/ decoder unit further comprises:
a delay module that is configured to delay a transfer of the received symbol to the second equalizer/decoder unit; and
a First-In, First-Out (FIFO) buffer that is used in the transfer of the first dibit to the second equalizer/decoder unit.

10. A receiver for processing a vestigial sideband (VSB) signal, the receiver comprising:
a first equalizer/decoder unit that is configured to perform a first equalizing operation, a first Trellis-Coded Modulation (TCM) decoding and a first Reed-Solomon (RS) decoding on a received symbol to output a first dibit; and
a second equalizer/decoder unit that is configured to perform a second equalizing operation, a second TCM decoding and a second RS decoding on the received symbol to output a transport stream,
wherein the first dibit is provided as a priori information for a soft-decision operation of the second TCM decoding, and
wherein the second equalizer/decoder unit comprises:
a second equalizer that is configured to perform the second equalizing operation;
a second TCM decoder that is configured to perform the second TCM decoding on an output of the second equalizer by using the first dibit as a priori information;
a second de-interleaver that is configured to de-interleave an output of the second TCM decoder; and
a second RS decoder that is configured to perform the second RS decoding on an output of the second de-interleaver to output the transport stream.

11. The receiver of claim 10, wherein:
the second equalizer comprises a decision feedback equalizer, and
a path metric or a decision value based on the second TCM decoding is fed back from the second TCM decoder to the second equalizer.

12. The receiver of claim 10, wherein the second equalizer/ decoder unit further comprises:
a second delay module that is configured to delay and output the received symbol that is transferred from the first equalizer/decoder unit;
a second interleaver that is configured to interleave the transport stream from the second RS decoder;
a second dibit converter that is configured to convert a byte output of the second interleaver into a second dibit; and a First-In, First-Out (FIFO) buffer that is configured to buffer the second dibit.

* * * * *